April 2, 1957 H. CARLETON 2,787,513
SCRATCH RECORDER
Filed Aug. 24, 1954 2 Sheets-Sheet 1

INVENTOR
Henry Carleton

BY *W. E. Thibodeau & A. W. Dew*
ATTORNEYS.

INVENTOR
Henry Carleton

United States Patent Office 2,787,513
Patented Apr. 2, 1957

2,787,513

SCRATCH RECORDER

Henry Carleton, Silver Spring, Md., assignor to the United States of America as represented by the Secretary of the Army Application August 24, 1954, Serial No. 451,989

2 Claims. (Cl. 346—49)

(Granted under Title 35, U. S. Code (1952), sec. 266)

The invention described herein may be manufactured by or for the Government for governmental purposes without the payment to me of any royalties thereon.

This invention relates to recorders and more particularly to a device for recording events and in their proper time relationship.

One object of this invention is to provide a device for recording events in their proper time relationship.

Another object of this invention is to provide a recorder which is sufficiently rugged to survive and to maintain in readable condition recorded information even after the recording device has been subjected to severe impact forces.

The specific nature of the invention as well as other objects and advantages thereof will clearly appear from the following description and drawings in which.

Figure 1:
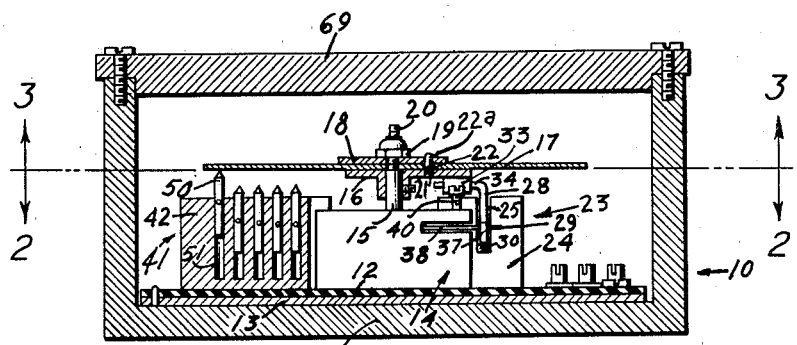
Figure 1 is a sectional elevation of the device taken along line 1—1 of Fig. 2.

All of the elements which comprise the invention are contained within a very heavy metal housing indicated generally by numeral 10. Connected together and secured to base 11 of housing 10 are two mounting plates 12 and 13. The top mounting plate 12 is of a nonconductive material upon which the connecting lugs and the subassemblies, to be described hereafter, are mounted. The clock assembly, indicated generally by numeral 14 is secured to and centrally of plate 12. Clock 14 may be any of the several types of mechanical clocks well known in the art. Shaft 15 is journaled vertically in the frame of and is driven by the said clock. Mounted upon shaft 15 and adapted to turn therewith is stop plate 16. Recording disc 17 is adapted to rest upon stop plate 16. The said recording disc is held rigidly in place upon shaft 15 and against stop plate 16 by washer 18 and nut 19. Nut 19 engages threaded portion 20 of shaft 15. Correct angular alignment is maintained between the said stop plate and the said recording disc by pin 21 which extends vertically from stop plate 16 and is received in hole 22 of recording disc 17 and hole 22a of washer 18.

Figure 5:
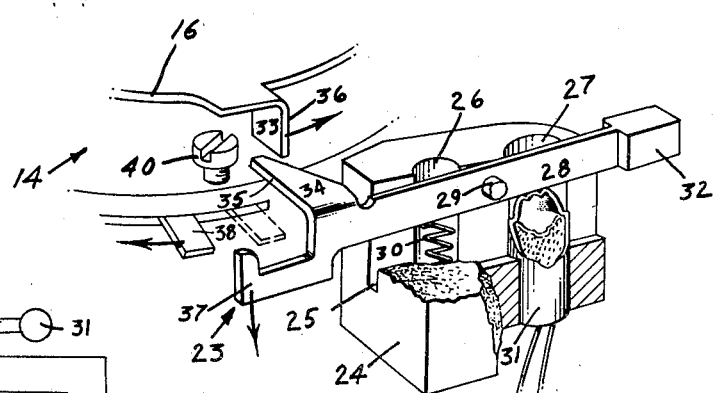
Figure 5 is a fragmentary sectional view of the clock actuating mechanism of Fig. 1.

Clock 14 and its cooperating members are restrained from turning, being in the wound position, by the clock actuating mechanism 23 (Figs. 1 and 5) which comprises clock actuator block 24 secured to plates 12 and 13. Block 24 is provided with groove 25 running lengthwise along the top of the said block, and apertures 26 and 27 disposed vertically within said block. Located within groove 25 is release arm 28 which is mounted upon and is adapted to pivot about shaft 29 journaled within block 24. Located within aperture 26 is helical spring 30 which acts against release arm 28, urging it upward at the point of contact. Located within aperture 27 is explosive motor 31 upon which release arm 28 rests. Counterweight 32 is secured to the outward end of release arm 28. The said counterweight cooperates with helical spring 30 and explosive motor 31 to maintain release arm 28 in the horizontal position when the recording device is in the wound position.

Stop plate 16 is provided with an ear 33 which is acted upon by finger 34 of release arm 28. The inner edge 35 of finger 34 acts against the leading side 36 of ear 33 to restrain stop plate 16 when release arm 28 is in the horizontal position and the recorder is in the wound position. Hook 37 of release arm 28 engages lever 38 to restrain the said lever against its being urged in the clockwise direction by a torsion spring, not shown. Lever 38 has the purpose of giving the clock escapement, not shown, a kick to start clock 14 when stop plate 16 is released by finger 34 of release bar 28. Stop 40 is anchored vertically in a stationary position in the frame of clock 14. Its purpose is to limit stop plate 16 and recording disc 17 to less than one complete revolution of travel from the wound position. The leading side 36 of ear 33 engages stop 40 after the completion of slightly less than one revolution to halt the rotation of stop plate 16 and the members adapted to rotate therewith.

Figure 2:
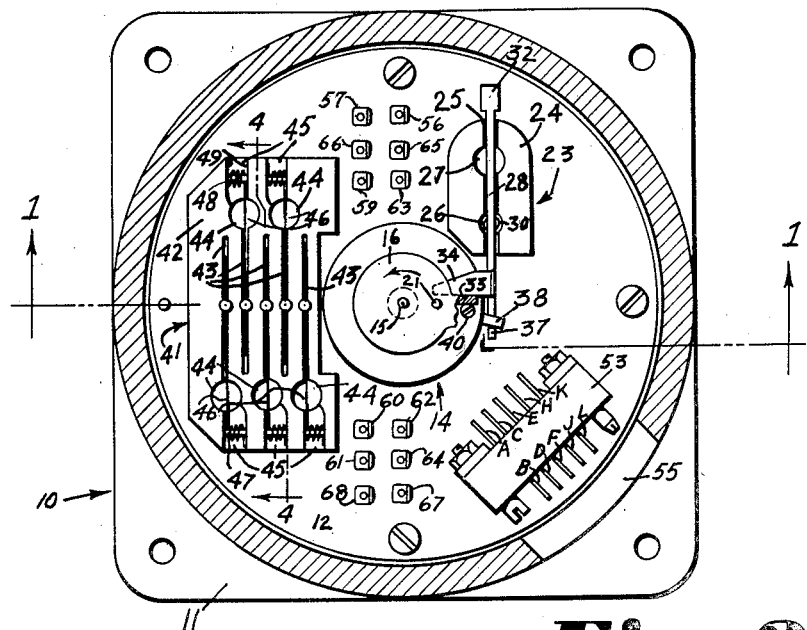
Figure 2 is a cross sectional view of the device taken along line 2—2 of Fig. 1.
Figure 3:
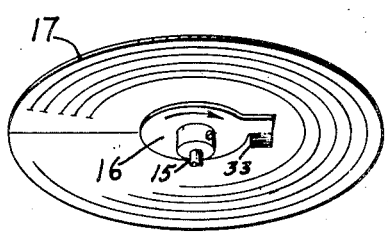
Figure 3 is a perspective view of the recording disc.
Figure 4:
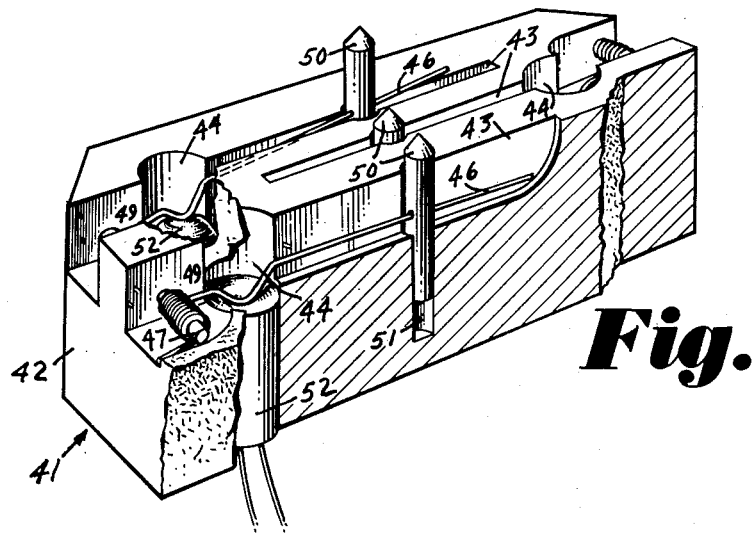
Figure 4 is a fragmentary sectional view of the scriber assembly in Fig. 1 taken on line 4—4 of Fig. 2.

The scriber assembly, the construction of which is best seen in Figs. 2 and 4, is indicated generally by numeral 41. It comprises scriber block 42 which is secured to plates 12 and 13. Block 42 is provided with a plurality of grooves 43 disposed parallel to one another and running lengthwise of the block along the top side thereof, originating at points somewhat inward from the ends of block 42 and terminating in recesses 44 disposed alternately at the two ends of the said block, there being two recesses 44 at one end and three recesses 44 at the other end of the said block, in the preferred embodiment of the invention. At the ends of block 42 and communicating with recesses 44 are recesses 45.

Located within grooves 43 and in interdigitated relationship with one another are cantilever springs 46. One end of the outer and middle springs 46 are coiled about shaft 47 whereas one end of the other two springs 46, disposed therebetween, are coiled about shaft 48. Shafts 47 and 48 are secured within block 42 at opposite ends thereof, their axes being parallel to one another but perpendicular to the parallel walls 49 of apertures 45. The free ends of springs 46 carry scribers 50, which are located in cylindrical apertures 51, the axes of which are vertical and which form a plane which is perpendicular to grooves 43. Located in recesses 44 and below springs 46 are explosive motors 52.

Terminal box 53 which is secured to plate 12 contains electric terminals A, B, C, D, E, F, H, J, K and L in communication with opening 55 in the housing 10.

Figure 6:
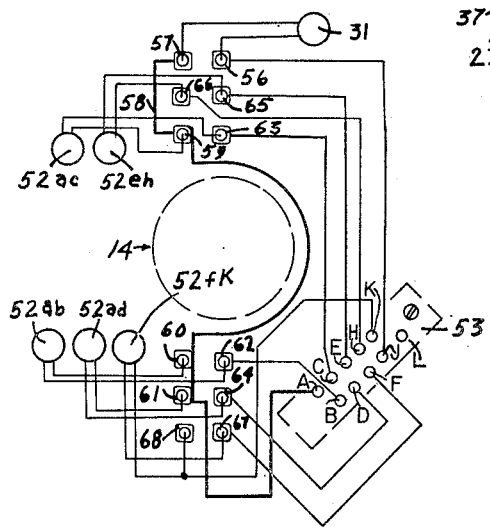
Figure 6 is a schematic electrical diagram of the circuit employed in the invention.

Fig. 6 shows the schematic electrical circuit of the recorder. Starting with terminal J there is a conductive path to lug 56, then to explosive motor 31, then to lug 57. Lug 57 is connected to ground lead 58. Ground lead 58 connects lugs 57, 59, 60 and 61, and terminal A. Explosive motor 52ab is connected to terminal B through lug 62 and to ground through lug 60. Explosive motor 52ac is connected to terminal C through lug 63 and to ground through lug 59. Explosive motor 52ad is connected to terminal D through lug 64 and to ground through lug 61. Explosive motor 52eh is connected to terminal E through lug 65 and to terminal H through lug 66. Explosive motor 52fk is connected to terminal F through lug 67 and directly to terminal K. Lug 68 and terminal L are extra connections. Cap 69 encloses the entire assembly.

The invention functions in the following manner: When the clock 14 is in the wound condition, recording disc 17 is positioned so that its "zero" line coincides with the line connecting the points of scribers 50. That alignment is maintained by pin 21 which engages stop plate 16 and recording disc 17. Scribers 50 are in the retracted position within grooves 43 of scriber assembly 41. At "zero" time an electrical pulse is received at terminals J and A, Fig. 6. Electrical energy is transmitted through the conductive path connecting explosive motor 31 with terminals J and A, to activate explosive motor 31 whereupon it becomes elongated, pushing release bar 28 upward at the point of contact, overcoming the urgings of counterweight 32 and helical spring 30. Release arm 28 pivots about shaft 29 causing the hook 37 of release arm 28 to disengage lever 38 and finger 34 to disengage ear 33 of stop plate 16. When lever 38 is released it moves clockwise under the urging of torsion spring, not shown. Lever 38 gives the clock escapement, not shown, a kick to start clock 14. Clock 14 is driven by its main drive spring, not shown, to cause shaft 15, stop plate 16, and recording disc 17 to turn together in a counterclockwise direction. The speed of rotation of shaft 15 is regulated by the clock escapement. Recording disc 17 is limited in its rotation to less than one revolution by means of stop 40 which engages ear 33 of stop plate 16. Should recording disc 17 be permitted to turn more than one revolution the markings recorded thereon would be rendered meaningless.

As events to be recorded at or after time "zero" occur, electrical pulses will be received at terminals A and B, then at terminals A and C, then at terminals A and D, then at terminals E and H, and finally at terminals F and K. Pulses may, however, appear at these various pairs of terminals in any other sequence depending upon when the particular event to be recorded occurs. A pulse appearing at terminals A and B will cause explosive motor 52ab to be activated as it is connected to these terminals through lugs 60 and 62 respectively. In like manner an electrical pulse appearing at terminals A and C will cause explosive motor 52ac to activate; a pulse at terminals A and D will cause explosive motor 52ad to activate; a pulse at terminals E and H will cause explosive motor 52eh to activate and a pulse at terminals F and K will cause explosive motor 52fk to activate.

Activation of an explosive motor 52 of the scriber assembly will cause that explosive motor to become elongated. Such elongation results in an upward force against a cantilever spring 46 at the point of contact. The said spring rises slightly from its previously retracted position carrying scriber 50 upward. In the extended position scriber 50 makes contact with recording disc 17. The pressure exerted by scriber 50 against recording disc 17 is just sufficient to inscribe markings upon the disc as it turns.

The period of time which elapses between time "zero" and the time when the event to be recorded occurs is measured directly by a template, not shown, which is placed over recording disc 17, the recording disc having been disassembled from the recorder. The template is designed to convert directly into time the included angle between the "zero" line of recording disc 17 and the line which originates in the center of recording disc 17 and passes through the point where scriber 50 first engages recording disc 17.

It is to be understood that the form of the invention, herewith shown and described, is to be taken as a preferred example of the same, and that various changes in shape, size and arrangement of parts may be resorted to without departing from the spirit of the invention or the scope of the claims.

I claim:

1. A device for recording events in time relationship comprising a housing, a recording disc upon which markings are inscribed, a shaft and plate for supporting the said recording disc, a clock and escapement means for driving and regulating the speed of the recording disc support, a plurality of scribers so disposed as to engage the said recording disc to leave an impression thereon, a plurality of springs carrying the said scribers and adapted to maintain the said scribers in the retracted position, a plurality of explosive motors adapted to act against the said springs to cause the said scribers to assume an extended position engaging the said recording disc, electrical means adapted to activate the said explosive motors, a release arm releasably engaging the recording disc support to prevent it from rotating before the occurrence of a reference time, another explosive motor adapted to cause the said release arm to disengage the recording disc support, electrical means for activating said other explosive motor at the reference time, and a stop for limiting rotation of said recording disc to less than one complete revolution.

2. A device for recording events in time relationship comprising a housing, a recording disc upon which markings are inscribed, a shaft and plate upon which said recording disc is supported and with which said recording disc turns, a mechanical clock and escapement mechanism engaging said shaft and by which said shaft is caused to rotate at a regulated speed, the said clock and escapement mechanism being mounted within said housing, a plurality of scribers which, in the extended position, are adapted to engage the said recording disc, spring means adapted to support the said scribers near to one end of the said springs, the said springs being adapted to normally maintain the scribers in the retracted position, a plurality of explosive motors positioned below said springs and adapted to act against the springs to cause the scribers to assume the extended position when the said explosive motors are activated, electrical means for activating the said explosive motors, an arm releasably engaging the said recording disc support, additional spring means maintaining said arm releasably engaging said recording disc support, an additional explosive motor adapted to overcome the urging of said additional spring means to permit said arm to release said support, electrical means for activating said additional explosive motor at reference time, and a stationary stop adapted to engage said recording disc support to limit the rotation of said support and its associated recording disc to less than one complete revolution.

References Cited in the file of this patent

UNITED STATES PATENTS 2,622,678     Peterson     Dec. 23, 1952